3,054,702
POLYMERIC ALKYLENE OXIDE PROPELLANTS CONTAINING MICROSCOPIC CRYSTALS OF LITHIUM OR MAGNESIUM SALTS

Leonard A. Stengel and Emory E. Toops, Jr., Terre Haute, Ind., assignors to Commercial Solvents Corporation, New York, N.Y., a corporation of Maryland
No Drawing. Filed Aug. 28, 1959, Ser. No. 836,582
5 Claims. (Cl. 149—19)

Our invention relates to new compositions of matter suitable for use as propellants comprising adducts of lower alkylene oxides with oxidant salts selected from the group consisting of chlorates and perchlorates of lithium and magnesium. More particularly, it relates to adducts of lower alkyleneoxy groups with lithium or magnesium radicals and chlorate and perchlorate radicals.

Many of the solid propellants in use at the present time are of the composite propellant type, consisting of a fuel and oxidizer together with ingredients used to control the physical and chemical properties of the propellant. The processing sequences used in the preparation of a composite type propellant are very involved. The size of the oxidizer crystals (ammonium perchlorate, ammonium nitrate, etc.) is very important and has a major effect on the burning rate of the propellant. The type and amount of fuel used (plastic, rubber type, nitro polymer, etc.) must be selected for its ability to be oxidized and for adding desirable physical properties to the mixture. Additives and inhibitors are also generally blended into the mixtures. Obtaining a uniform mix of all the ingredients before extrusion, casting, curing, etc., is sometimes very difficult.

Our new solid propellant compositions are prepared by mixing lower alkylene oxides such as ethylene oxide or propylene oxide with a chlorate or perchlorate or either lithium or magnesium and allowing polymerization to take place at room temperature or above.

The exact chemical constitution of our new compositions is not at this time definitely known. In solution form they appear to be adducts of the lower alkylene oxides with the chlorates or perchlorates of lithium or magnesium; or, in other words, adducts of lower alkyleneoxy groups with chlorate or perchlorate radicals and with lithium or magnesium radicals. When the lower alkylene oxides, such as ethylene oxide, and either lithium chlorate or perchlorate, or magnesium chlorate, or perchlorate, are mixed, the salts go into solution followed by a subsequent reaction in solution form. Upon curing, the alkylene oxide appears to polymerize with the subsequent decomposition of the adduct. The final cured propellant composition is a plastic solid consisting of a matrix of polymerized alkylene oxide containing microscopic crystals of the chlorate or perchlorate of lithium or magnesium. It is distinctly understood, however, that we are not restricted to any theory as to what, if any, reaction may take place upon the mixing of the ingredients which enter into our new compositions.

The chemical constitution of our new compositions depends, to some extent, upon a number of factors; such as, the desired physical and propellant properties of the final composition as well as the original starting materials, the temperatures at which the operation is carried out, the time element, etc. The following table shows the ratios of the ingredients which can be used at 15° C. to give a liquid or solution form of composition:

70% by weight lithium chlorate—30% by weight ethylene oxide
66% by weight lithium perchlorate—34% by weight ethylene oxide
50% by weight lithium perchlorate—50% by weight propylene oxide
66% by weight magnesium perchlorate—34% by weight ethylene oxide
20.3% by weight lithium perchlorate, 42.7% by weight magnesium perchlorate—37% by weight ethylene oxide The densities of the above solutions range from approximately 1.4 to approximately 1.45. In order to keep the compositions in liquid or solution form for extended periods of time, it is necessary to maintain them at temperatures not substantially in excess of −20° C. Maintained at approximately room temperature, they are slowly transformed into solid, waxy materials, the hardness and melting points of which can be regulated by holding the compositions at varying elevated temperatures for different periods of time.

In preparing our compositions, we prefer to use lithium chlorate or perchlorate, or magnesium chlorate or perchlorate in amounts ranging from approximately 36 to approximately 83% by weight to approximately 17 to approximately 64% of ethylene or propylene oxide. Somewhat less desirable compositions, however, can be obtained by using amounts somewhat outside of these specified ranges. When using propylene oxide in place of ethylene oxide, somewhat better results are generally obtained by using slightly lower amounts thereof than when using ethylene oxide.

Our new compositions can be prepared over a fairly wide range of temperature, the upper temperature being preferably somewhat below the boiling point of the alkylene oxide and the lower temperature being determined by the freezing point of the alkylene oxide. While we have prepared our compositions at temperatures substantially above the boiling points of the respective alkylene oxides with satisfactory results, in general, the losses of alkylene oxide at temperatures substantially in excess of the boiling point of the alkylene oxide, are such that the use of such temperatures is in general not desirable, unless the operation is carried out in a closed vessel under pressure, to prevent losses of alkylene oxide.

Our new compositions can be prepared satisfactorily at room temperature by contacting the dry lithium chlorate or perchlorate, or magnesium chlorate or perchlorate with either ethylene oxide or propylene oxide in vapor or liquid form until a liquid composition is formed. During this operation a small amount of heat is usually evolved, but can be conveniently removed by cooling if the temperature rise is excessive. By lowering the temperature somewhat below the boiling point of ethylene oxide, the process can be conveniently carried out by contacting the dry chlorate or perchlorate with liquid ethylene oxide. When using the alkylene oxide in the liquid form the desired amount of the solid metal chlorate or perchlorate can be added directly to the liquid alkylene oxide with stirring until solution is complete. Another convenient method of producing our compositions at room temperature, or even somewhat higher temperatures, consists of first saturating a hydrocarbon such as kerosene with ethylene oxide and then slowly adding the lithium or magnesium chlorate or perchlorate and stirring until a clear solution is obtained. The latter remains at the bottom of the vessel and is insoluble in the hydrocarbon and, hence, separation of the final product is easily effected by decantation or otherwise.

Liquid compositions prepared as above-described remain liquid when stored at temperatures below −20° C. If, however, the solutions are held at a temperature above 0° C., they slowly change to a soft plastic phase and then into a hard, waxy solid having melting points, depending upon age and temperature of formation, ranging from 50° to 140° C. and densities in the range of 1.5 to 1.6. The hardness, melting point and density of the solid can be controlled by the temperature maintained during the chemical change from the liquid to the solid phase. The chemical change or polymerization occurring can also be controlled and accelerated by the addition of a small amount of ammonia, an alkyl amine or other additive. While in the liquid, or preferably in the soft plastic phase, any of the additives commonly used in propellants, such as, for example, aluminum powder, can be readily incorporated, if desired.

Our new compositions are excellent monopropellants and their composition range is unlimited up to the saturation point of the lithium chlorate or perchlorate, or magnesium chlorate or perchlorate in the alkylene oxide used. To utilize them in the form of waxy solids, the solid is melted and cast into a desired form, depending upon the type of use to which the material is to be put. The composition, for example, can then be bonded to the motor casing in which it is to be used, with an adhesive such as a diisocyanate type adhesive. Or, if desired, the waxy compositions can be melted and directly poured into the motor casing which contains a Teflon lined center star form or other type cores to give the desired burning surface. After the waxy composition has solidified, the Teflon lined form can be easily removed. The waxy compositions themselves have very strong adhering properties.

Our compositions have high specific impulses as both liquid and solid monopropellants. For example, a solution containing 65% by weight of anhydrous lithium perchlorate and 35% by weight of ethylene oxide has a theoretical specific impulse, at 500 p.s.i.a. of 227 seconds. Polymerization of the solution reduces this specific impulse, the actual value depending upon the degree of polymerization of the ethylene oxide.

Other suitable methods of using our new compositions will be obvious to those skilled in the art.

Now having described our invention, what we claim is:

1. Compositions consisting essentially of a solid matrix of from about 17 to about 64% by weight of polymerized lower alkylene oxide containing microscopic crystals of an oxidant salt selected from the group consisting of the chlorates and perchlorates of lithium and magnesium and mixtures thereof.

2. Compositions consisting essentially of a solid matrix of from about 17 to about 64% by weight of polymerized ethylene oxide containing microscopic crystals of an oxidant salt selected from the group consisting of the chlorates and perchlorates of lithium and magnesium and mixtures thereof.

3. Compositions consisting essentially of a solid matrix of from about 17 to about 64% by weight of a polymerized propylene oxide containing microscopic crysals of an oxidant salt selected from the group consisting of the chlorates and perchlorates of lithium and magnesium and mixtures thereof.

4. Compositions consisting essentially of a solid matrix of from about 17 to about 64% by weight of polymerized lower alkylene oxide containing microscopic crystals of an oxidant salt selected from the group consisting of the chlorates and perchlorates of lithium and mixtures thereof.

5. Compositions consisting essentially of a solid matrix of from about 17 to about 64% by weight of polymerized lower alkylene oxide containing microscopic crystals of an oxidant salt selected from the group consisting of the chlorates and perchlorates of magnesium and mixtures thereof.

References Cited in the file of this patent

UNITED STATES PATENTS 3,004,840     Pruitt et al.  ------------ Oct. 17, 1961

OTHER REFERENCES

Noland: Chemical Engineering, May 19, 1958, page 155.

Zaehringer: Missiles and Rockets, vol. 3, No. 3, March 1958, p. 69.

Zaehringer: "Solid Propellant Rockets, Second Stage," American Rocket Co., Box 1112, Wyandotte, Mich., September 1958, pages 203–219, especially 211–212.